US00RE41664E

(19) United States
(12) Reissued Patent
Mabuchi

(10) Patent Number: US RE41,664 E
(45) Date of Reissued Patent: Sep. 14, 2010

(54) SOLID-STATE IMAGING DEVICE, DRIVING METHOD THEREFOR, AND IMAGING APPARATUS

(75) Inventor: Keiji Mabuchi, Kanagawa (JP)

(73) Assignee: Sony Corporation, Tokyo (JP)

(21) Appl. No.: 11/930,546

(22) Filed: Oct. 31, 2007

Related U.S. Patent Documents

Reissue of:
(64) Patent No.: 7,244,921
Issued: Jul. 17, 2007
Appl. No.: 11/419,858
Filed: May 23, 2006

(30) Foreign Application Priority Data

May 26, 2005 (JP) ..... P2005-153336

(51) Int. Cl.
*H04N 5/335* (2006.01)

(52) U.S. Cl. ..... 250/208.1; 348/308; 348/E3.018
(58) Field of Classification Search ..... 250/208.1; 348/294, 302, 308, E3.018
See application file for complete search history.

(56) References Cited

U.S. PATENT DOCUMENTS

2006/0266923 A1 * 11/2006 Mabuchi ..... 250/208.1
2006/0285000 A1 * 12/2006 Mabuchi ..... 348/308

FOREIGN PATENT DOCUMENTS

WO WO1997/017800 5/1997

OTHER PUBLICATIONS

Orly Yadid_Pecht and Eric R. Fossum; Wide Intrascene Dynamic Range CMOS APS Using Dual Sampling; IEEE Transactions on Electron Devices, vol. 44, No. 10; Oct. 1997.
Mitsuhito Mase et al.; A 19.5b Dynamic Range CMOS Image Sensor with 12b Column–Parrallel Cyclic A/D Converters; 2005 IEEE International Solid–State Circuits Conference.

* cited by examiner

*Primary Examiner*—John R Lee
(74) *Attorney, Agent, or Firm*—Sonnenschein Nath & Rosenthal LLP

(57) ABSTRACT

A solid-state imaging device includes the following: a pixel array section in which a plurality of pixels are two-dimensionally arranged, each of the pixels outputting an image signal; and a column circuit area including a plurality of column circuits. In the solid-state imaging device, a vertical signal line through which image signals from a single column of pixels are output is selectively connected to a given number, which is more than one, of the column circuits, and a signal from a selected pixel row is selectively output to one of the given number of the column circuits so that signals read out from the same pixel can be sent to the same column circuit.

19 Claims, 10 Drawing Sheets

SOLID-STATE IMAGING DEVICE, DRIVING METHOD THEREFOR, AND IMAGING APPARATUS

Matter enclosed in heavy brackets [ ] appears in the original patent but forms no part of this reissue specification; matter printed in italics indicates the additions made by reissue.

CROSS REFERENCES TO RELATED APPLICATIONS

The present invention contains subject matter related to Japanese Patent Application JP 2005-153336 filed in the Japanese Patent Office on May 26, 2005, the entire contents of which are incorporated herein by reference.

BACKGROUND OF THE INVENTION

1. Field of the Invention

The present invention relates to solid-state imaging devices, driving methods therefor, and imaging apparatuses, and more particularly, to a solid-state imaging device, a driving method therefor, and an imaging apparatus that can establish a wide dynamic range by acquiring signals of different sensitivities from one pixel and synthesizing the acquired signals.

2. Description of the Related Art

In the field of solid-state imaging devices, e.g., MOS (Metal Oxide Semiconductor) solid-state imaging devices, a technology to achieve a wide dynamic range is known. More specifically, high-sensitivity and low-sensitivity signals are obtained from each pixel by setting different storage times (exposure times), i.e., long and short storage times, to the pixel, and are then synthesized, whereby a wide dynamic range can be achieved. Each pixel includes a photoelectric conversion element, and a plurality of pixels are two-dimensionally arranged in a matrix form in a pixel array section. In addition, in the pixel array section, a vertical signal line is disposed for each column of the arranged pixels.

First Related Art

As one of the related arts of the above-described technology (hereinafter referred to as a "first related art"), a solid-state imaging device having the following configurations is known. Two column circuits (signal processing circuits), each of which is configured to perform predetermined signal processing upon a pixel signal sent through a signal line disposed for a column of pixels in a pixel array section, are disposed for each of a plurality of columns of pixels and perform signal processing in parallel upon high-sensitivity and low-sensitivity signals sent through one signal line from one pixel, respectively (see, for example, Orly Yadid-Pecht and Eric R. Fossum, "Wide Intrascene Dynamic Range CMOS APS Using Dual Sampling", IEEE TRANSACTIONS ON ELECTRON DEVICES, VOL. 44, NO. 10, pp. 1721-1723, OCTOBER 1997).

The concept of the first related art will be described with reference to FIGS. 1A and 1B. The physical layout of a pixel array section 101 and two column circuit groups 102 and 103 is shown as FIG. 1A. The concept of scanning performed upon the pixel array section 101 is shown as FIG. 1B. The pixel array section 101 has 18 rows×22 columns of pixels for the sake of simplification of the drawing. Each column circuit in the column circuit groups 102 and 103 is disposed for a column of pixels.

A scanning operation performed upon the pixel array section 101 is performed in units of rows of pixels. The process of the scanning operation includes two steps, i.e., an electronic shutter scanning step for eliminating electric charge stored in a photoelectric conversion element included in a pixel and a readout scanning step for reading out electric charge stored in the photoelectric conversion element. In the readout scanning step, two scanning operations are performed.

A period of time corresponding to the period of time taken to scan the area from a row of pixels (hereinafter referred to as a "shutter row") upon which the electronic shutter scanning is performed to a row of pixels (hereinafter referred to as a "readout row 1") upon which a first readout scanning is performed, is defined as a storage time 1. A period of time corresponding to the period of time taken to scan the area from the readout row 1 to a row of pixels (hereinafter referred to as a "readout row 2") upon which a second readout scanning is performed, is defined as a storage time 2. By making the storage times 1 and 2 different from each other, two signals of different sensitivities, i.e., a low-sensitivity signal and a high-sensitivity signal, can be obtained.

Referring to FIGS. 1A and 1B, the storage times 1 and 2 are periods of time taken to scan four rows of pixels and eight rows of pixels, respectively. Therefore, a signal with twice sensitivity can be obtained from each pixel in the readout row 2 compared with a signal obtained from each pixel in the readout row 1. By synthesizing the two signals of different sensitivities obtained from each pixel included in the same row of pixels in a signal processing circuit (not shown) at a subsequent stage, an image signal having a wide dynamic range can be obtained.

Second Related Art

As another related art to achieve a wide dynamic range (hereinafter referred to as a "second related art"), a solid-state imaging device having the following configurations is known. Two electronic shutter scanning operations and two readout scanning operations are performed, and by making time intervals between a first electronic shutter scanning operation and a first readout scanning operation and between a second electronic shutter scanning operation and a second readout scanning operation different from each other, two signals of different sensitivities are obtained. Here, one column circuit is disposed for one column of pixels. The two signals obtained from the two readout scanning operations are processed in the same column circuit (see, for example, M. Mase, S. Kawahito, M. Sasaki, and Yasuo Wakamori, "A 19.5b Dynamic Range CMOS Image Sensor with 12b Column-Parallel Cyclic A/D Converters", ISSCC Dig. Tech. Papers, pp. 350-351, February 2005).

The concept of the second related art will be described with reference to FIGS. 2A and 2B. The physical layout of a pixel array section 201 and a column circuit group 202 is shown as FIG. 2A. The concept of scanning performed upon the pixel array section 201 is shown as FIG. 2B. The pixel array section 201 has 18 rows×22 columns of pixels for the sake of simplification of the drawing. Each column circuit in the column circuit group 202 is disposed for a corresponding column of pixels.

Two scanning operations are performed upon the pixel array section 201. In a first scanning operation, a period of time corresponding to the period of time taken to scan the area from a shutter row to a readout row is defined as a storage time 1. In a second scanning operation, a period of time corresponding to the period of time taken to scan the area from a shutter row to a readout row is defined as a storage time 2. By making the storage times 1 and 2 different from each other, two signals of different sensitivities, i.e., a low-sensitivity signal and a high-sensitivity signal, can be obtained. Referring to FIGS. 2A and 2B, the storage times 1 and 2 are periods of time taken to scan four rows of pixels and eight rows of pixels, respectively.

SUMMARY OF THE INVENTION

In the above-described first related art, two signals are acquired from the same pixel. The signal that is acquired when the pixel is read out in the readout row 1 is processed in the column circuit group 102, and the signal that is acquired when the pixel is read out in the readout row 2 is processed in the column circuit group 103. That is, the two signals acquired from the same pixel are processed in different column circuits, whereby an error between the two signal levels can undesirably occur owing to different characteristics between the column circuit groups 102 and 103. This signal level error causes problems when the subsequent signal synthesis processing is performed. More specifically, owing to the signal level error, brightness does not smoothly change, color changes, and noise occurs around a connection of the high- and low-sensitivity signals on the image with a wide dynamic range acquired by synthesizing the image signals.

On the other hand, in the second related art, since signals of different sensitivities output from the same pixel are processed in the same column circuit, the problem of the first related art due to different characteristics between column circuits does not occur. However, since two scanning operations are performed, a time shift between outputting of the high- and low-sensitivity signals occurs. The time shift corresponds to at least one scanning time, i.e., the period of time taken by the read out row to move through in a pixel array section for a scanning operation. This time shift leads to the following problem.

For example, when the one scanning time takes 1/60 of a second, the time shift between outputting of the high-and low-sensitivity signals is at least 1/60 of a second. This means that quite a long time shift of 1/60 of a second occurs compared with the storage time (exposure time) of, for example, 1/4000 or 1/500 of a second. This time shift undesirably causes blurring of an image due to hand movement and swaying subjects.

Referring to FIG. 19.3.4 in the above-mentioned non-patent document of the second related art, column circuits (each of which includes a noise canceller and a cyclic ADC) are disposed on both upper and lower sides of a pixel array section. However, in fact, since the column circuits disposed on both upper and lower sides are integrated as a column circuit, one column circuit is disposed for each column of pixels. This integrated column circuit has two column-parallel circuits parallel to pixel arrangement, so the column-parallel circuits are disposed on the upper and lower sides, respectively. In this non-patent document, six scanning periods are set as one frame period.

Accordingly, it is desirable to provide a solid-state imaging device, a driving method therefor, and an imaging apparatus capable of acquiring a high-quality image signal by performing signal processing in the same column circuit upon a plurality of signals of different sensitivities output from the same pixel and by accurately synthesizing the processed signals of different sensitivities preventing a time shift of one scanning period between outputting of the plurality of signals.

According to embodiments of the present invention, there is provided a solid-state imaging device including the following: a pixel array section in which a plurality of pixels are two-dimensionally arranged, each of the pixels outputting an image signal; and a column circuit area including a plurality of column circuits. In the solid-state imaging device, a vertical signal line through which image signals from a single column of pixels are output is selectively connected to a given number, which is more than one, of the column circuits, and a signal from a selected pixel row is selectively output to one of the given number of the column circuits so that signals read out from the same pixel can be sent to the same column circuit.

According to embodiments of the present invention, there is provided an imaging apparatus including the following: a pixel array section in which a plurality of pixels are two-dimensionally arranged, each of the pixels outputting an image signal; a column circuit area including a plurality of column circuits; and a signal processing portion for performing processing upon a signal output from said column circuit area. In the imaging apparatus, a vertical signal line through which image signals from a single column of pixels are output is selectively connected to a given number, which is more than one, of the column circuits, and a signal from a selected pixel row is selectively output to one of the given number of the column circuits so that signals read out from the same pixel can be sent to the same column circuit.

DESCRIPTION OF THE PREFERRED EMBODIMENTS

First Embodiment

Figure 1B:
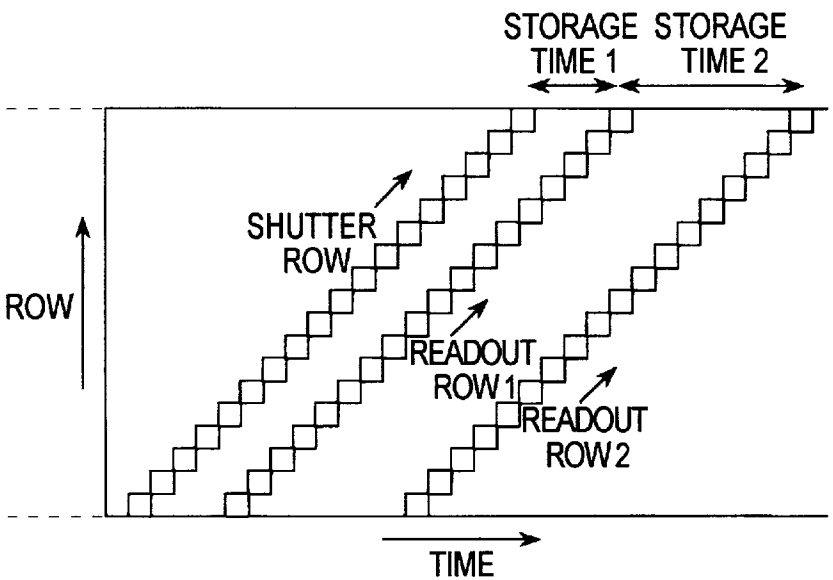
FIG. 1B is a diagram showing a concept of a first related art.
Figure 1A:
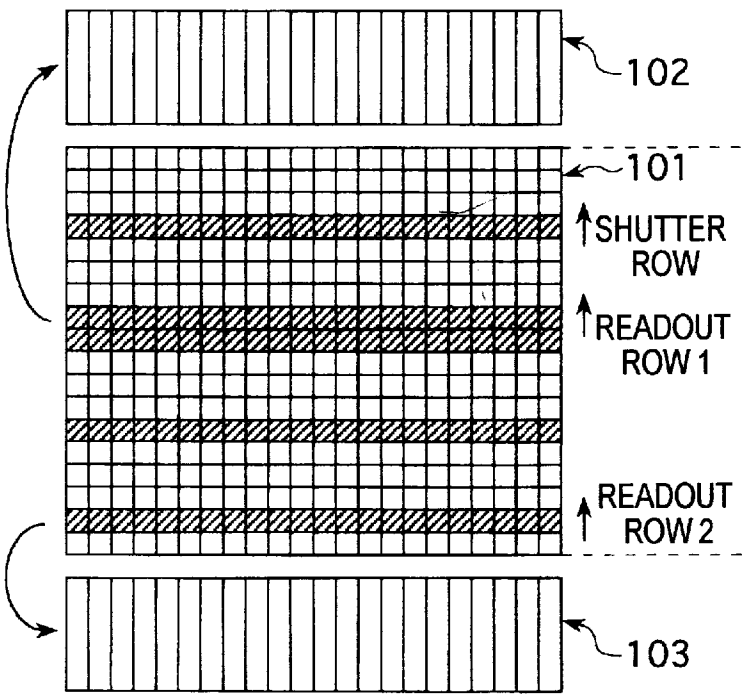
FIG. 1A is a diagram showing a concept of a first related art.
Figures 2A, 2B:
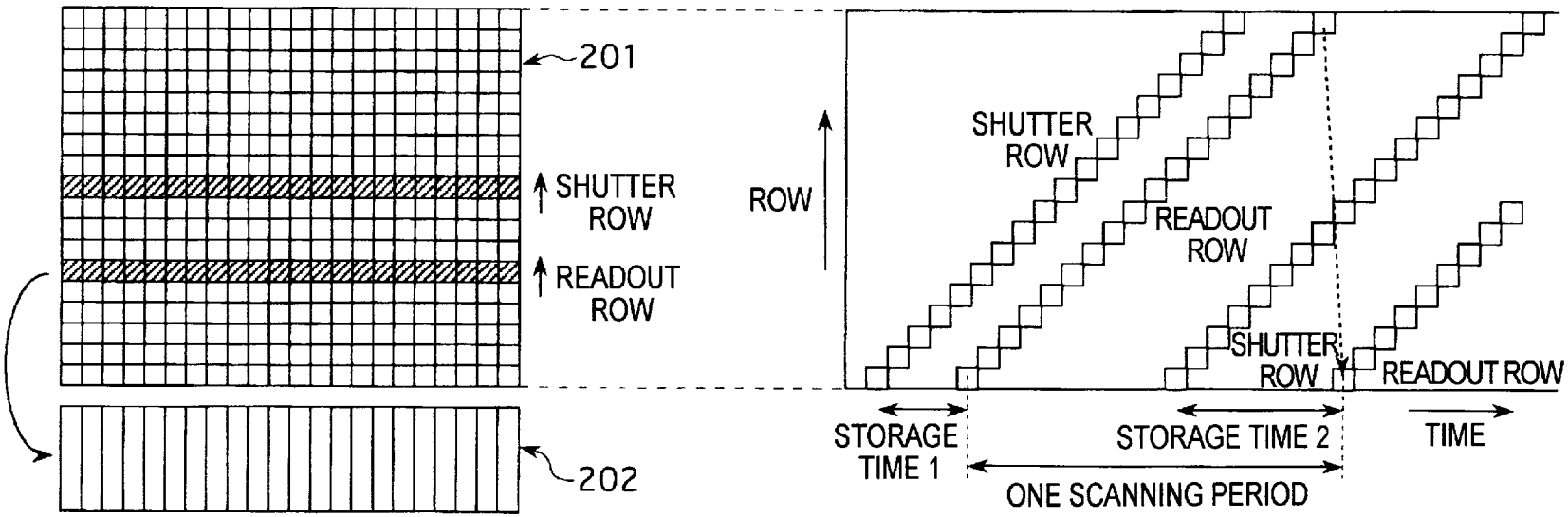
FIG. 2A is a diagram showing a concept of a second related art.
FIG. 2B is a diagram showing a concept of a second related art.
Figure 3:
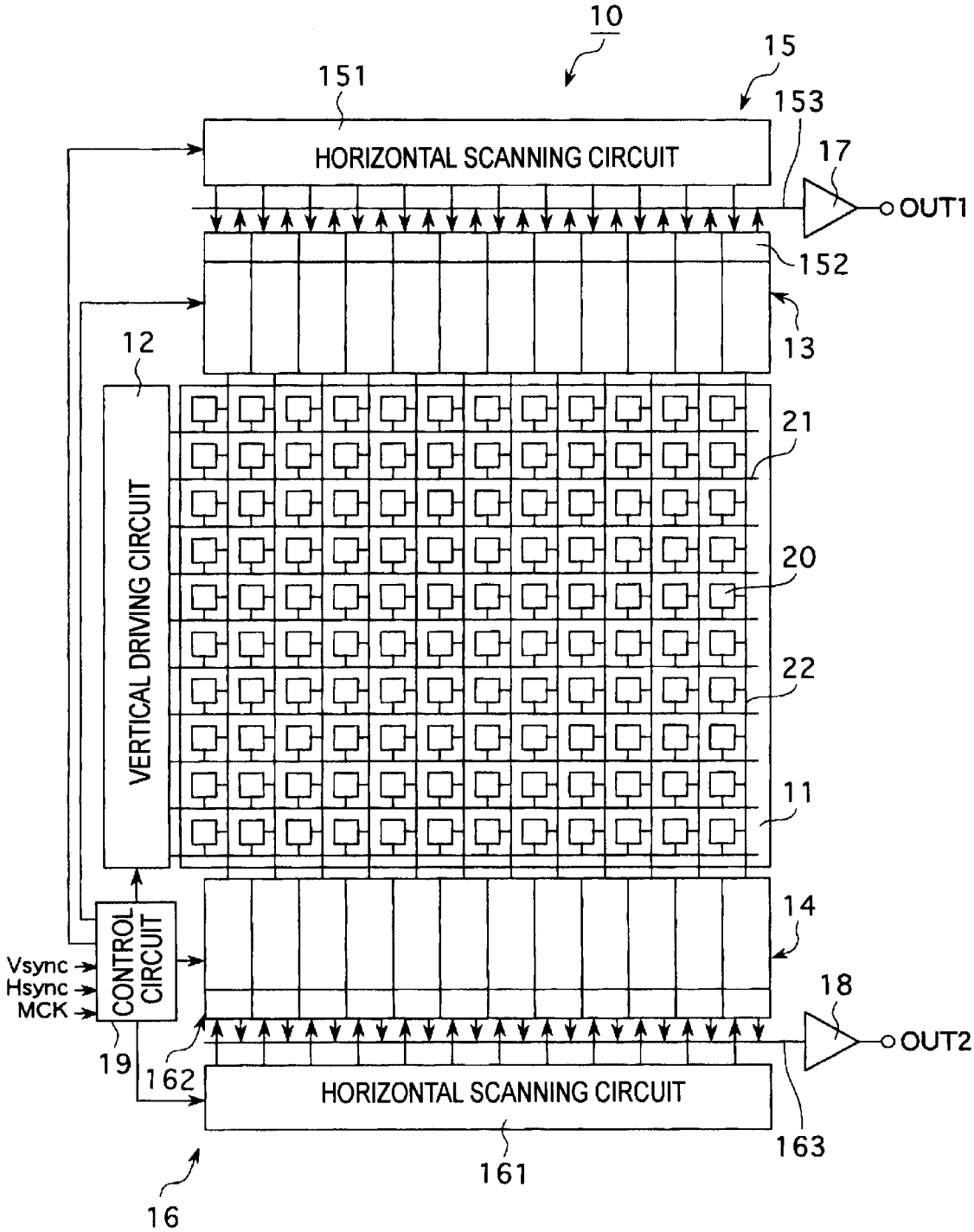
FIG. 3 is a system configuration schematic diagram showing a configuration of a solid-state imaging device according to a first embodiment of the present invention.

FIG. 3 is a system configuration schematic diagram showing a configuration of a solid-state imaging device according to the first embodiment of the present invention. This embodiment will be described by using a CMOS (Complementary Metal Oxide Semiconductor) image sensor as an example of a solid-state imaging device.

Referring to FIG. 3, a solid-state imaging device 10 according to this embodiment has a system configuration in which the following components are provided: a pixel 20 that includes a photoelectric conversion element for photoelectrically converting, for example, incident light into electric charge having a quantity of electric charge corresponding to an amount of incident light and outputs a signal representing an external physical quantity; a pixel array section 11 in which a plurality of pixels 20 are two-dimensionally arranged in a matrix form; a vertical driving circuit 12; n (n is an integer of two or more, n=2 in this embodiment) column circuit (column-parallel signal processing circuit) groups 13 and 14; horizontal driving circuits 15 and 16; output circuits 17 and 18; and a control circuit 19.

In this system configuration, the control circuit 19 externally receives instruction data of an operational mode, etc., for the solid-state imaging device 10 via an interface (not shown), and externally outputs data including information on the solid-state imaging device 10. In addition, the control circuit 19 generates clock signals, control signals, etc., used as references of operations of the vertical driving circuit 12, the column circuit groups 13 and 14, and the horizontal driving circuits 15 and 16 on the basis of a vertical synchronizing signal Vsync, a horizontal synchronizing signal Hsync, and a master clock MCK, and then provides the generated signals to each circuit.

In the pixel array section 11, a plurality of pixels 20 are arranged in a matrix form, and a pixel driving line 21 is provided for each row of pixels in the horizontal direction of this drawing, and a vertical signal line 22 is provided for each column of pixels in the vertical direction of this drawing.

Pixel Circuit

Figure 4:
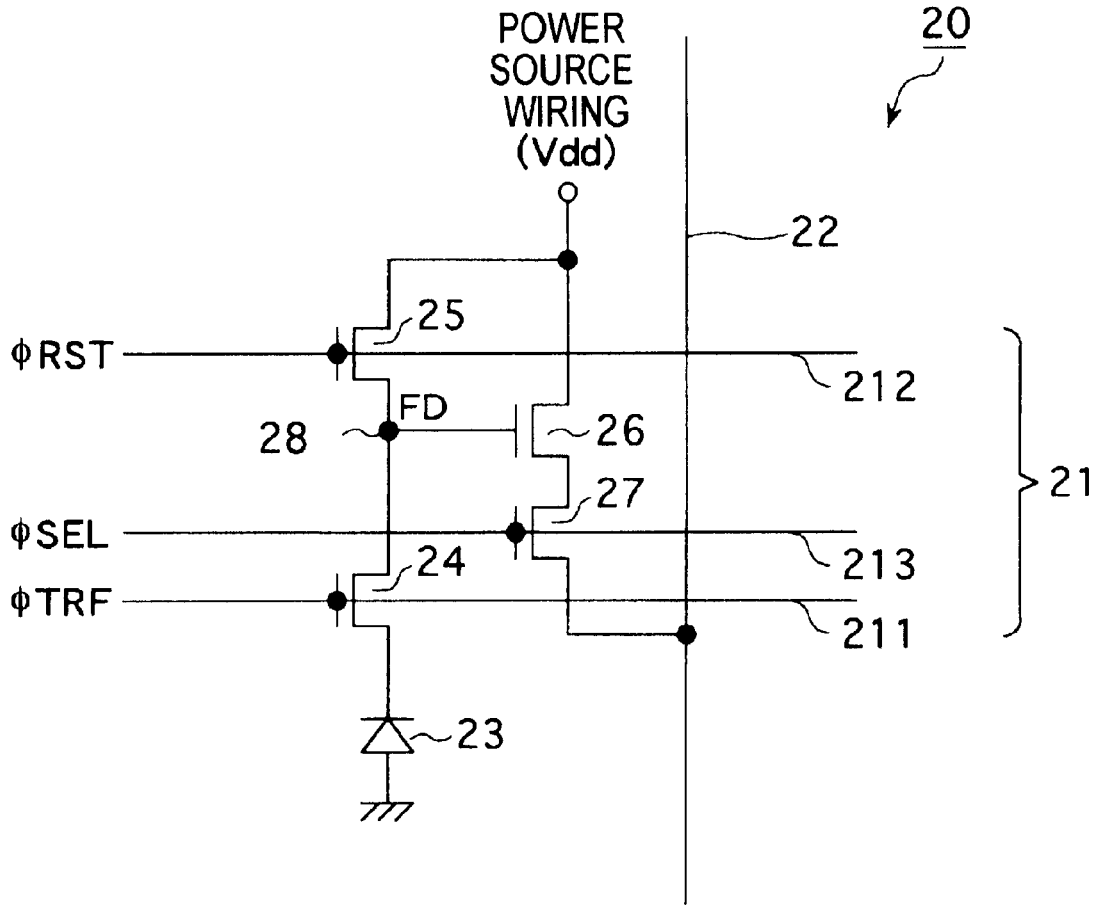
FIG. 4 is a circuit diagram showing an exemplary circuit configuration of a pixel.

FIG. 4 is a circuit diagram showing an exemplary circuit configuration of the pixel 20.

As shown in FIG. 4, the pixel 20 having the exemplary circuit configuration is configured as a pixel circuit in which not only a photoelectric conversion element such as a photodiode 23, but also four transistors such as a transfer transistor 24, a reset transistor 25, an amplifying transistor 26, and a selection transistor 27 are provided. Here, N-channel MOS transistors are used as these transistors 24 through 27. A transfer line 211, a reset line 212, and a selection line 23 are provided through pixels 20 in the same row of pixels as the pixel driving line 21.

The photodiode 23 photoelectrically converts received light into photocharge (here, electrons) that has a quantity of electric charge corresponding to an amount of light received. A cathode of the photodiode 23 is electrically connected to a gate of the amplifying transistor 26 via the transfer transistor 24. Anode electrically connected to the gate of the amplifying transistor 26 is called an FD (floating diffusion) portion 28. The FD portion 28 converts electric charge into voltage.

The transfer transistor 24 is connected between the cathode of the photodiode 23 and the FD portion 28. The transfer transistor 24 is activated when a gate thereof receives a transfer pulse ϕTRF via the transfer line 211, and then transfers photocharge having been photoelectrically converted and stored in the photodiode 23 to the FD portion 28.

A drain and a source of the reset transistor 25 are connected to power source wiring Vdd and the FD portion 28, respectively. The reset transistor 25 is activated when a gate thereof receives a reset pulse ϕRST via the reset line 212 and then resets the FD portion 28 by allowing charge stored in the FD portion 28 to flow into the power source wiring Vdd before signal charge is transferred from the photodiode 23 to the FD portion 28.

The gate and a drain of the amplifying transistor 26 are connected to the FD portion 28 and the power source wiring Vdd, respectively. The amplifying transistor 26 outputs the potential of the FD portion 28 as a reset level after the reset operation performed by the reset transistor 25, and outputs the potential of the FD portion 28 as a signal level after signal charge is transferred from photodiode 23 to the FD portion 28 by the transfer transistor 24.

A drain and a source of the selection transistor 27 are connected to, for example, a source of the amplifying transistor 26 and the vertical signal line 22, respectively. The selection transistor 27 is activated when a gate thereof receives a selection pulse ϕSEL via a selection line 213, and sets the pixel 20 in a selection state and then passes on a signal output from the amplifying transistor 26 to the vertical signal line 22.

The selection transistor 27 may be connected between the power source wiring Vdd and the drain of the amplifying transistor 26.

Each of the pixels 20 may be configured with three transistors such as the transfer transistor 24, the reset transistor 25, and a transistor combining functions of the amplifying transistor 26 and the selection transistor 27 instead of the four transistors.

Referring back to FIG. 3, the vertical driving circuit 12 configured with a shift register or a decoder sequentially performs a selection scanning operation upon the pixels 20 in the pixel array section 11 in units of rows and then provides a necessary driving pulse (control pulse) to each of the pixels 20 in the selected row via the pixel driving lines 21.

Although not shown in this drawing, the vertical driving circuit 12 has a configuration in which the following systems are provided: a readout scanning system for performing a readout operation by sequentially selecting the pixels 20 in units of rows and reading out the signal of each of the pixels 20 in the selected row; and an electronic shutter scanning system for performing an electronic shutter operation by eliminating (resetting) electric charge stored in the photodiode 23 included in each of the pixels 20 in the same row selected by the readout scanning system a predetermined time before the readout scanning operation is performed by the readout scanning system, the predetermined time corresponding to a shutter speed.

A period from the time when unnecessary electric charge stored in the photodiode 23 is reset in accordance with the shutter scanning operation performed by the electronic shutter scanning system to the time when a signal of the pixel 20 is read out in accordance with the readout scanning operation performed by the readout scanning system corresponds to the storage time (exposure time) of signal electric charge in the pixel 20. That is, the electronic shutter operation is an operation for resetting signal electric charge stored in the photodiode 23 and causing the photodiode 23 to start storing signal electric charge again.

A signal output from each of the pixels 20 in a selected row is provided to the column circuit group 13 or 14 via a corresponding vertical signal line 22. The column circuit groups 13 and 14 are disposed on the upper and lower sides of the pixel array section 11, respectively, so that each column circuit in the column circuit groups 13 and 14 can be disposed for an individual column of pixels, that is, a one-to-one correspondence between column circuits and columns of pixels can be achieved. The column circuit groups 13 and 14 receive a signal output from each of the pixels 20 in one row in a column-by-column basis and performs signal processing upon the received signal, the signal processing being, for example, signal amplification and CDS (Correlated Double Sampling) for removing a fixed pattern noise specific to a pixel. Each column circuit of the column circuit groups 13 and 14 may have an A/D (analog/digital) conversion function.

The horizontal driving circuits 15 and 16 are provided so as to correspond to the column circuit groups 13 and 14, respectively. The horizontal driving circuit 15 is configured with a horizontal scanning circuit 151, a horizontal selection switch group 152, and a horizontal signal line 153. The horizontal scanning circuit 151 is configured with a shift register, etc., and causes the signals of a row, upon which signal processing has been performed in individual column circuits of the column circuit group 13, to be sequentially output to the horizontal signal line 153 by sequentially selecting the switches in the horizontal selection switch group 152.

Like the horizontal driving circuit 15, the horizontal driving circuit 16 is configured with a horizontal scanning circuit 161, a horizontal selection switch group 162, and a horizontal signal line 163. The horizontal scanning circuit 161 also performs a horizontal scanning operation so as to cause signals of a row, upon which signal processing has been performed in individual column circuits of the column circuit group 14, to be sequentially output to the horizontal signal line 163 by sequentially selecting the switches of the horizontal selection switch group 162.

The output circuits 17 and 18 perform various signal processing operations upon signals sequentially sent via the horizontal selection switch groups 152 and 162 and the horizontal signal lines 153 and 163 from each column circuit in the column circuit groups 13 and 14, and then output the processed signals as output signals OUT1 and OUT2, respectively. Specific signal processing performed in the output circuits 17 and 18 may be, for example, only buffering operations, or may be not only buffering operations but also black level control operations, correction operations of variations in signals output from individual columns, signal amplification operations, color-related processing operations, etc., performed before the buffering operations.

In the solid-state imaging device 10 according to this embodiment with the above-described configuration, the vertical driving circuit 12 performs the above-described shutter scanning operation and the two readout scanning operations upon each pixel in the pixel array section 11. In the readout scanning operations, the vertical driving circuit 12 selects two readout rows 1 and 2, which are separated from each other by the number of rows of m (m is an integer of one or more) multiplied by (2p+1) row (p=0, 1, 2, . . . ), that is, the number of rows of m multiplied by an odd number of rows, and performs a scanning operation upon each of the selected readout rows 1 and 2, and then reads out a signal from each of the pixels 20 in the readout rows 1 and 2 to the vertical signal line 22. The two column circuit groups 13 and 14 are respectively provided so as to correspond to the two readout rows 1 and 2.

On the basis of these vertical scanning operations, a period of time corresponding to the period of time taken to scan the area from the shutter row to the readout row 1, upon which a first scanning operation is performed, is defined as a storage time 1, and a period of time corresponding to the period of time taken to scan the area from the readout row 1 to the readout row 2, upon which a second scanning operation is performed, is defined as a storage time 2. By making the storage times 1 and 2 different from each other, two signals of different sensitivities, i.e., a low-sensitivity signal and a high-sensitivity signal, can be sequentially obtained. Setting of the storage times 1 and 2 is performed by the control circuit 19. By synthesizing the two signals of different sensitivities in a signal processing circuit (not shown) at a subsequent stage, an image signal having a wide dynamic range can be obtained.

The solid-state imaging device 10 according to this embodiment is characterized by a method of changing the combinations of the two readout rows 1 and 2 and the two column circuit groups 13 and 14, as scanning performed by the vertical driving circuit 12 proceeds by m rows under the control of the control circuit 19. That is, the solid-state imaging device 10 according to this embodiment is characterized by a method of providing a signal output from each pixel of the pixels 20 in the readout row 1 and a signal output from each pixel of the pixels 20 in the readout row 2, i.e., two signals of different sensitivities, to the two column circuit groups 13 and 14. However, the method is performed under the condition that the number of rows between the readout rows 1 and 2 is set to m by (2p+1) rows, i.e., m by an odd number of rows. The reason for performing the method under this condition will be described later.

Here, the concept of a method of providing a signal when m=1, i.e., when the combinations of the readout rows 1 and 2 and the two column circuit groups 13 and 14 are changed as scanning proceeds row by row, will be described with reference to FIGS. 5A and 5B. The pixel array section 11 has 18 rows×22 columns of pixels for the sake of simplification of the drawing. When a unit period of scanning is defined as H, the storage time 1 is 4H, and the storage time 2 is 9H (p=1).

Figure 5B:
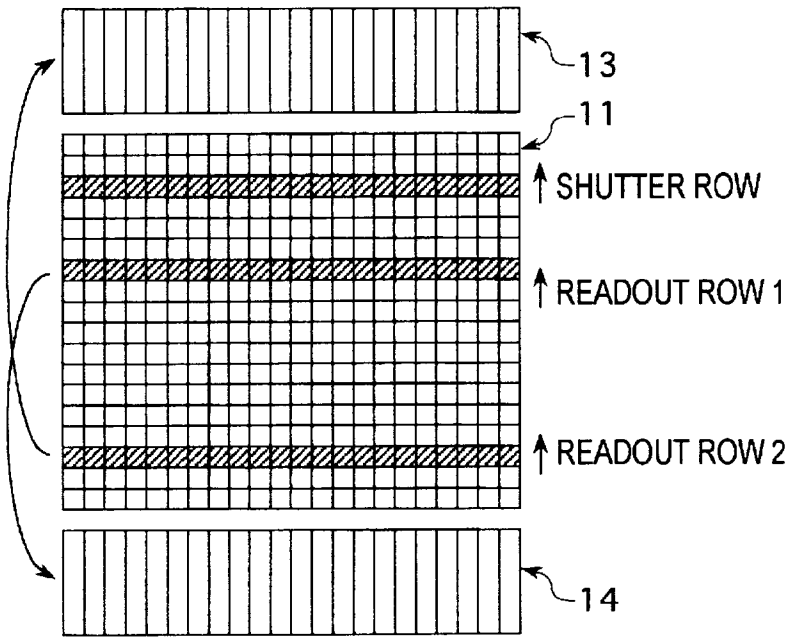
FIG. 5B is a diagram showing a concept of a method of providing a signal according to the first embodiment.
Figure 5A:
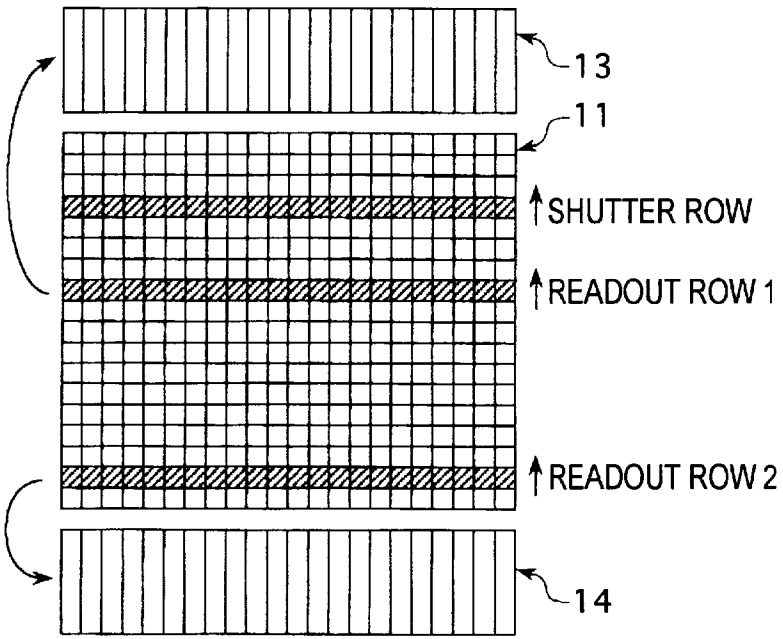
FIG. 5A is a diagram showing a concept of a method of providing a signal according to the first embodiment.

FIGS. 5A and 5B shows a relative location of the shutter row and the readout rows 1 and 2 at a certain point. However, in fact, the same row becomes the readout row 1 after 4H of scanning the shutter row, and becomes the read out row 2 after 9H of scanning the readout row 1. Consequently, two signals of different sensitivities, i.e., low-and high-sensitivity signals, can be sequentially obtained from each of the pixels 20 (same pixel).

At a certain point, as shown in FIG. 5A, signals output from the readout rows 1 and 2 are provided to the column circuit groups 13 and 14, respectively. That is, a signal read out from each of the pixels 20 in the readout row 1 is input into the corresponding column circuit of the column circuit group 13 via a corresponding vertical signal line 22. Similarly, a signal read out from each of the pixels 20 in the readout row 2 is input into the corresponding column circuit of the column circuit group 14 via a corresponding vertical signal line 22.

When scanning proceeds by one row, the shutter row upon which the electronic shutter scanning is performed and two readout rows 1 and 2 similarly proceed by one row. As shown in FIG. 5B, signals output from the readout rows 1 and 2 are provided to the column circuit groups 14 and 13, respectively. That is, a signal output from each of the pixels 20 in the readout row 1 is input into the corresponding column circuit of the column circuit group 14 via the corresponding vertical signal line 22. Similarly, a signal output from each of the pixels 20 in the readout row 2 is input into the corresponding column circuit of the column circuit group 13 via the corresponding vertical signal line 22.

Figure 6:
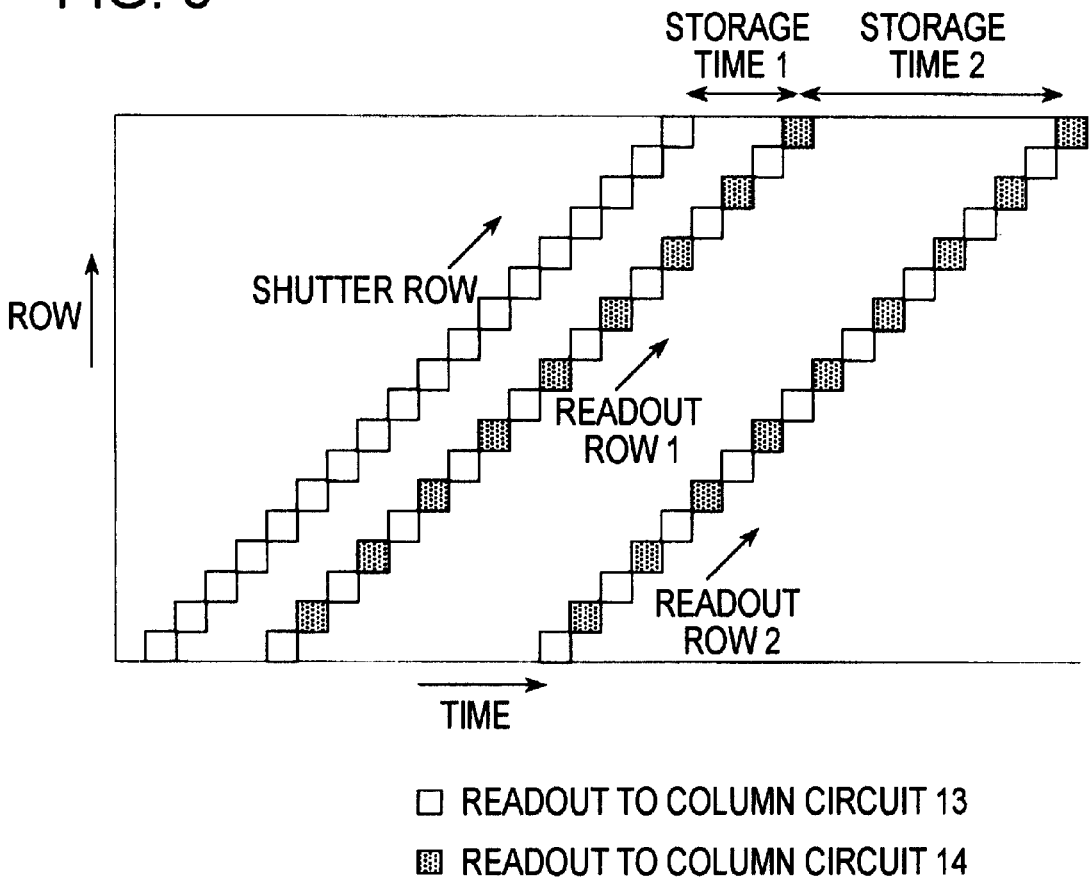
FIG. 6 is a diagram showing a concept of scanning according to the first embodiment.

When scanning further proceeds by one row, as shown in FIG. 5A, a signal read out from each of the pixels 20 in the readout row 1 is input into the corresponding column circuit of the column circuit group 13 via the corresponding vertical signal line 22. Similarly, a signal read out from each of the pixels in the readout row 2 is input into the corresponding column circuit of the column circuit group 14 via the corresponding vertical signal line 22. Thus, each time scanning proceeds by one row, signals output from the readout rows 1 and 2 are alternately provided to the column circuit groups 13 and 14, respectively. The concept of scanning in this case is shown in FIG. 6.

As described previously, the following settings are used: the number of rows between the readout rows 1 and 2 is set to an odd number; the storage time 2 is set to the period of time obtained by multiplying a unit period of scanning H by the odd number (9H in this example); and the combinations of the readout rows 1 and 2 and the column circuit groups 13 and 14 are set so as to change each time scanning proceeds by one row. Consequently, as apparent from FIG. 6, two signals that have different storage times and have been sequentially output from the same pixel in the odd rows are provided to the column circuit group 13 together. In contrast, two signals that have different storage times and have been sequentially output from the same pixel in the even rows are provided to the column circuit group 14 together.

That is, two continuing signals that have storage times 1 and 2 and have been sequentially output from the same pixel are processed in the same column circuit group 13 or 14. Accordingly, since the two signals having different storage times are not affected by the characteristic difference between the column circuit groups 13 and 14, the two signals of different sensitivities can be accurately synthesized in a signal processing circuit (not shown) at a subsequent stage, the signal processing circuit performing a synthesis operation so as to achieve a wide dynamic range.

Since two storage times 1 and 2 are in consecutive order, there is no need to wait for one scanning period so as to acquire two signals of different sensitivities. In addition, the time shift of one scanning period between outputting of two signals of different sensitivities does not occur. Accordingly, the case in which shutter time is short (shutter speed is low) can be supported. For example, when the storage times 1 and 2 are 1/4000 and 1/500 of a second, respectively, a shutter can be triggered at a speed of 1/500 of a second even if one scanning period is 1/60 of a second.

If the storage time 2 is set to the period of time obtained by multiplying a unit period of scanning H by an even number, two signals that have different storage times and have been sequentially output from the same pixel are processed in the column circuit groups 13 and 14, respectively, even if the combinations of the readout rows 1 and 2 and the two column circuit groups 13 and 14 are changed each time scanning proceeds by one row. Accordingly, it is important to set the storage time 2 to the period of time obtained by multiplying the unit period of scanning H by an odd number. This limitation actually does not matter by making the storage time 2 longer than another storage time.

The above-described switching of the combinations of the readout rows 1 and 2 and the column circuit groups 13 and 14 is performed under the control of the control circuit 19. A specific example of the control will be described.

Figure 7:
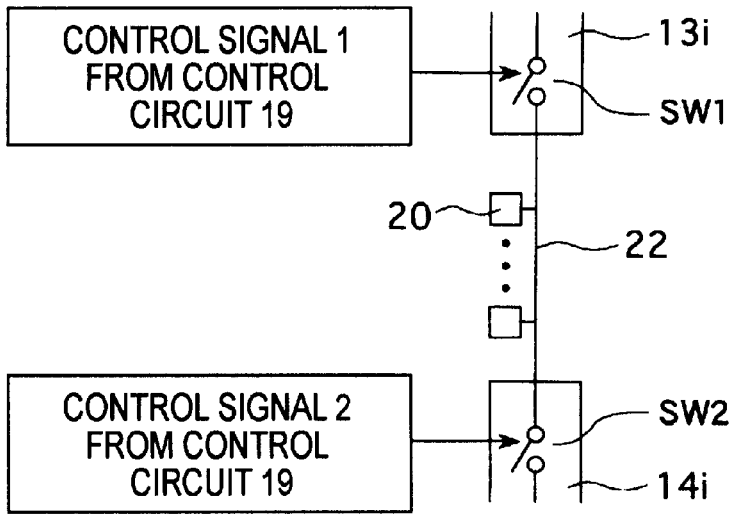
FIG. 7 is a circuit diagram showing a configuration of input stages in column circuits that correspond to a column of pixels.

FIG. 7 is a circuit diagram showing a configuration of input stages in column circuits 13i and 14i that are included in the column circuit groups 13 and 14, respectively, and correspond to a certain column of pixels i. As shown in FIG. 7, the input stages in the column circuits 13i and 14i are provided with switches SW1 and SW2 between the column circuits 13i and 14i and corresponding ends of the vertical signal line 22, respectively. The switches SW1 and SW2 are controlled to be on (closed)/off (open) in accordance with control signals 1 and 2 output from the control circuit 19, respectively.

Figure 8:
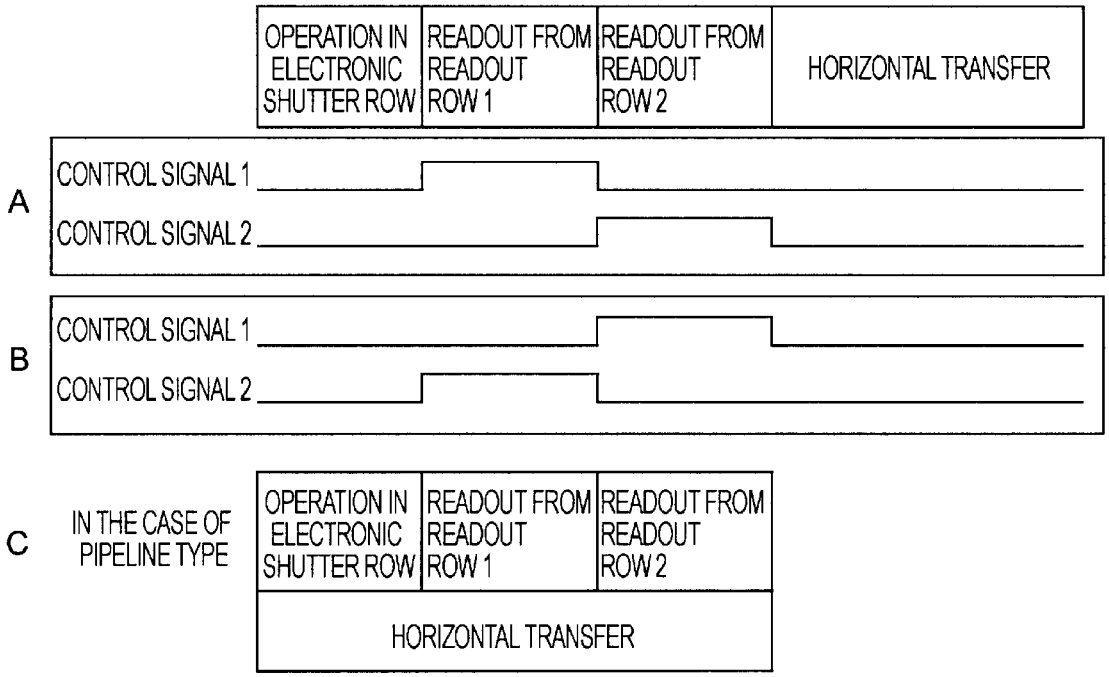
FIG. 8 is a timing chart showing operations in a 1 H period.

FIG. 8 is a timing chart showing operations in a 1 H period. When signals from the readout rows 1 and 2 are provided to the column circuits 13i and 14i, respectively, operations based on a time relationship shown in A of FIG. 8 are performed.

That is, when a readout operation is performed upon the readout row 1, the control signal 1 output from the control circuit 19 is in an active state (high level). In response to the control signal 1, the switch SW1 is activated, whereby two signals sequentially read out from each of the pixels 20 in the readout row 1 to the vertical signal line 22 are input into the column circuit 13i via the switch SW1. When a readout operation is performed upon the readout row 2, the control signal 2 output from the control circuit 19 is in an active state. In response to the control signal 2, the switch SW2 is activated, whereby two signals sequentially read out from each of the pixels 20 in the readout row 2 to the vertical signal line 22 are input into the column circuit 14i via the switch SW2.

In contrast, when signals from the readout rows 1 and 2 are provided to the column circuits 14i and 13i, respectively, operations based on the time relation shown in B of FIG. 8 are performed.

Thus, operations in the 1 H period are completed as follows: two signals are provided to the column circuit 13i or 14i; predetermined signal processing is performed upon the two signals in the column circuit 13i or 14i; and the processed two signals are horizontally transferred (horizontally output) under the control of the horizontal driving circuit 15 or 16. After that, the scanning operation proceeds by one row under the control of the vertical driving circuit 12, and the above-described sequence of operations is started from the onset of the electronic shutter operation.

In a case where each column circuit in the column circuit groups 13 and 14 is configured as a pipelined circuit for receiving a signal via the vertical signal line 22 and successively outputting the received signal to the horizontal driving circuit 15 or 16, the horizontal transfer operation is performed in parallel with the electronic shutter operation and the readout operation. Referring to C in FIG. 8, immediately after the readout operation is performed on the readout row 2, the scanning operation proceeds by one row, and the electronic shutter operation is then started.

EXEMPLARY MODIFICATIONS

Figure 9:
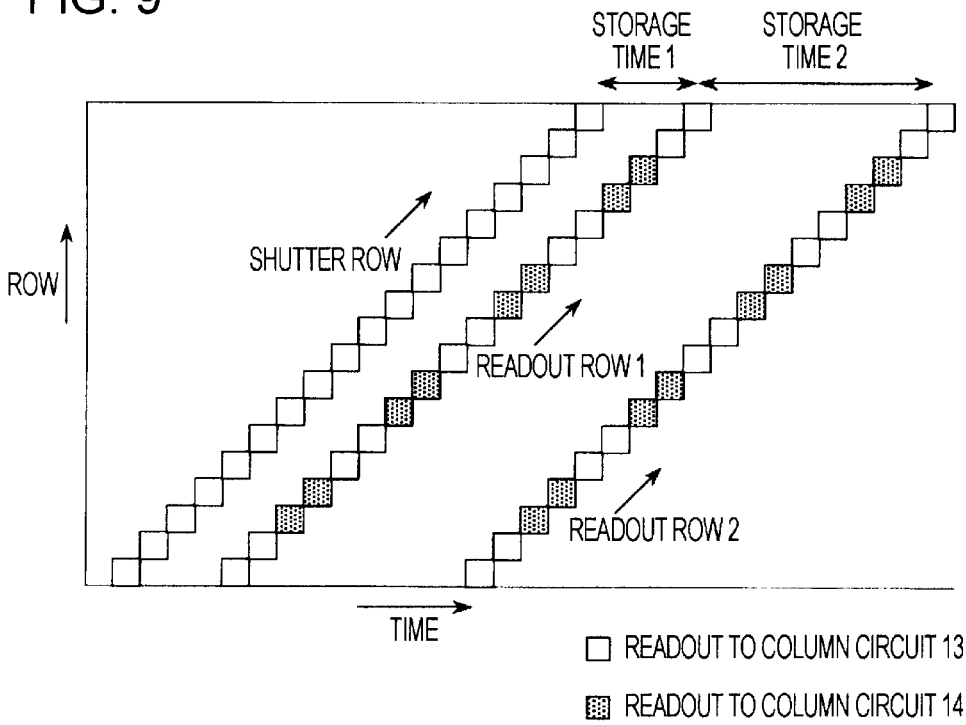
FIG. 9 is a diagram showing a concept of scanning of an exemplary modification according to the first embodiment.

This embodiment has been described using the case in which m=1, i.e., the combinations of the readout rows 1 and 2 and the two column circuit groups 13 and 14 are changed as scanning proceeds by one row, by way of example. As shown in FIG. 9, however, the switching may be performed as scanning proceeds by two rows (m=2). In this case, the number of rows between the readout rows 1 and 2 is limited to (2p+1) rows×2, i.e., double the number of rows when m=1. That is, the storage time 2 is limited to a 4H step such as 2, 6, and 10. This limitation also does not matter by making the storage time 2 longer than another storage time.

Similarly, other methods can be employed. For example, the storage time 2 is set to a 6H step such as 3, 9, and 15 by setting the number of rows between the readout rows 1 and 2 to (2p+1) rows×3, i.e., triple the number of rows when m=1 so that the combinations of the readout rows 1 and 2 and the two column circuit groups 13 and 14 can be changed as scanning proceeds by three rows (m=3).

In this embodiment, the two column circuit groups 13 and 14 are disposed on the upper and lower sides of the pixel array section 11, respectively. However, the two column circuit groups 13 and 14 may be disposed on the upper or lower side of the pixel array section 11 together.

Furthermore, in this embodiment, each column circuit of the column circuit groups 13 and 14 is disposed for one column of pixels in the pixel array section 11 so that a one-to-one correspondence between column circuits and columns of pixels can be achieved. However, one column circuit may be shared by a plurality of columns. In this case, the column circuit is time-shared. By employing such a configuration, the horizontal length of each circuit configuring the column circuit groups 13 and 14 can be increased, whereby the case in which a pixel pitch of the solid-state imaging device 10 is small can be supported.

Still furthermore, in this embodiment, in order to achieve a wide dynamic range, each pixel in the pixel array section 11 is set in the two readout rows 1 and 2 so that the storage time, i.e., sensitivity of each of the pixels 20 can be changed in two stages. In addition, the two column circuit groups 13 and 14 are provided. However, other configurations can be employed.

For example, when the sensitivity is desired to be changed in n stages, the following configuration can be generally employed: the number of n column circuit groups, i.e., the number of n column circuits, are disposed for one column of pixels; and when a scanning operation is performed upon the number of n readout rows, the relationship between the n readout rows and the n column circuits are changed, as well as, the number of n rows between the n readout rows is controlled so that outputs from the same row can be input into the same column circuit.

For example, when the combinations of readout rows and column circuits are desired to be cyclically changed in an n×H period by circularly changing the combinations of readout rows and column circuits as scanning proceeds by one row, the individual numbers of delayed rows between a leading readout row and the number of n−1 succeeding readout rows may be controlled so that the individual numbers cannot be divided by n, as well as, the values of remainders of the division by n can be different from each other. For example, when n=4, the above-described conditions can be satisfied by setting the succeeding readout rows to the 9th, 34th, and 131st rows from the row next to the leading readout row, respectively. That is, when the numbers of 9, 34, and 131 are divided by 4, the remainders are 1, 2, and 3, respectively. An example in the case of n=2 corresponds to the example in FIG. 6.

Alternatively, when the combinations of readout rows and column circuits are desired to be cyclically changed in an n×m×H period by circularly changing the combinations of readout rows and column circuits as scanning proceeds by m rows, the individual numbers of delayed rows between a leading readout row and the number of n−1 succeeding readout rows may be set to the values acquired by multiplying m by the values in the case of m=1. The example in FIG. 9 shows the case in which n=2 and m=2.

The circular change means that when n=3, for example, (1, 2, 3) corresponding to (A, B, C) first is made to sequentially and repeatedly correspond to (B, C, A), (C, A, B), (A, B, C), and so on. When n=2, the correspondence change operation is performed between two objects.

In this embodiment, the number of readout scanning rows and the number of column circuits are equal. However, the case in which the numbers are not equal can also be applied to the concept of the present invention.

Second Embodiment

Figure 10:
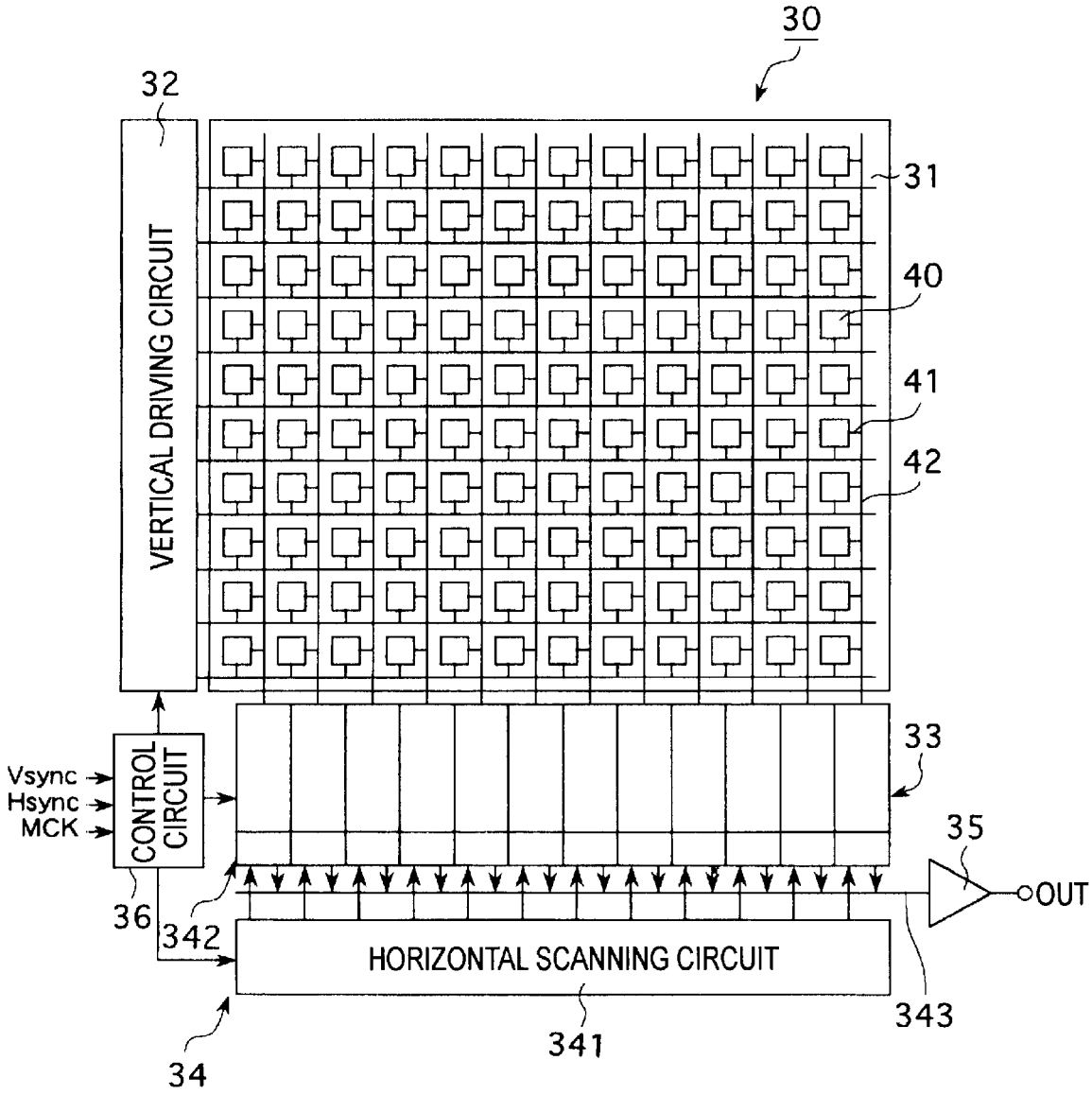
FIG. 10 is a system configuration schematic diagram showing a configuration of a solid-state imaging device according to a second embodiment of the present invention.

FIG. 10 is a system configuration schematic diagram showing a configuration of a solid-state imaging device according to the second embodiment of the present invention. This embodiment will be described by using a CMOS (Complementary Metal Oxide Semiconductor) image sensor as an example of a solid-state imaging device.

Referring to FIG. 10, a solid-state imaging device 30 according to this embodiment has a system configuration in which the following components are provided: a pixel 40 that includes a photoelectric conversion element for photoelectrically converting, for example, incident light into electric charge having a quantity of electric charge corresponding to an amount of the incident light and outputs a signal representing an external physical quantity; a pixel array section 31 in which a plurality of pixels 40 are two-dimensionally arranged in a matrix form; a vertical driving circuit 32; a column circuit group 33; a horizontal driving circuit 34; an output circuit 35; and a control circuit 36.

In this system configuration, the control circuit 36 externally receives instruction data of an operational mode, etc., for the solid-state imaging device 30 via an interface (not shown), and externally outputs data including information on the solid-state imaging device 30. In addition, the control circuit 36 generates clock signals, control signals, etc., used as references of operations of the vertical driving circuit 32, the column circuit 33 and the horizontal driving circuit 34 on the basis of a vertical synchronizing signal Vsync, a horizontal synchronizing signal Hsync, and a master clock MCK, and then provides the generated signals to each circuit.

In the pixel array section 31, a plurality of pixels 40 are arranged in a matrix form, a pixel driving line 41 is provided for each row of pixels in the row direction of this drawing, and a vertical signal line 42 is provided for each column of pixels in the vertical direction of this drawing. The pixel having four transistors shown in FIG. 4 or pixels having other configurations can be used as the pixel 40.

The vertical driving circuit 32 configured with a shift register or a decoder sequentially performs a selection scanning operation upon the pixels 40 in the pixel array section 31 in units of rows and then provides a necessary driving pulse (control pulse) to each of the pixels 40 in the selected row via the pixel driving line 41. Like the vertical driving circuit 12 according to the first embodiment, the vertical driving circuit 32 includes a readout scanning system and an electronic shutter scanning system. However, this embodiment is characterized by a method of scanning by means of the vertical driving circuit 32. The description of the scanning method will be given later.

A signal output from each of the pixels 40 in a selected row is provided to the column circuit group 33 via the corresponding vertical signal line 42. The column circuit group 33 is disposed, for example, on the lower side of the pixel array section 31 so that each column circuit in the column circuit group 33 can be disposed for individual columns of pixels, that is, a one-to-one correspondence between column circuits and columns of pixels can be achieved. The column circuit group 33 receives a signal output from each of the pixels 40 in a row on a column-by-column basis and performs signal processing such as CDS and signal amplification upon the received signal. Each column circuit in the column circuit group 33 may have an A/D conversion function.

The horizontal driving circuit 34 is configured with a horizontal scanning circuit 341, a horizontal selection switch group 342, and a horizontal signal line 343. The horizontal scanning circuit 341 configured with a shift register, etc., causes pixel signals to be sequentially output from each column circuit in the column circuit group 33 to the horizontal signal line 343 by sequentially selecting the switches of the horizontal selection switch group 342.

The output circuit 35 performs various signal processing operations upon signals sequentially sent via the horizontal signal line 343 from each column circuit in the column circuit group 33, and then outputs the processed signals. Specific signal processing performed by the output circuit 35 may be, for example, only a buffering operation, or may be not only buffering operation but also a black level control operation, a correction operation of variations in signals output from individual columns of pixels, a signal amplification operation, a color-related processing operation, etc., performed before the buffering operation.

In the solid-state imaging device 30 with the above-described configuration according to this embodiment, when a unit period of scanning is defined as H, the vertical driving circuit 32 makes a shutter row move forward by one row in an s×H (s is an integer of two or more) period. Moreover, the vertical driving circuit 32 makes a readout row move forward or backward every 1 H period as well as makes the readout row move both forward and backward in the s×H period so that the readout row can move forward by one row in total in the s×H period.

Figure 11A:
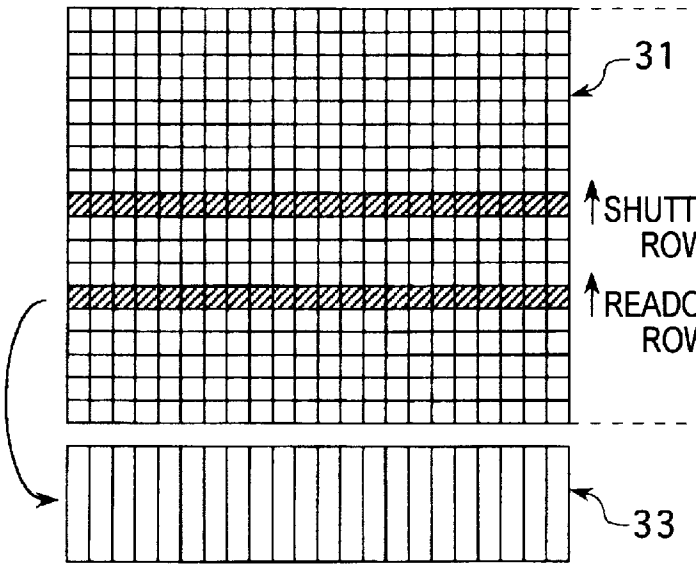
FIG. 11A is a diagram showing operations of a solid-state imaging device according to the second embodiment.
Figure 11B:
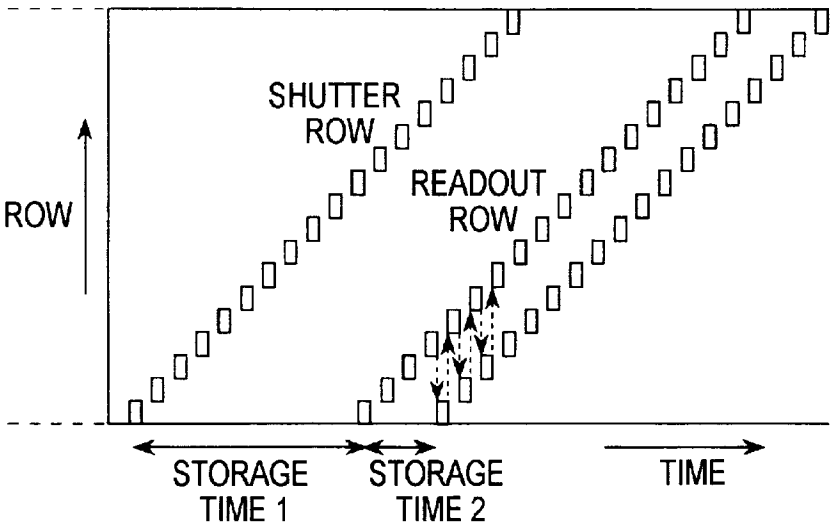
FIG. 11B is a diagram showing operations of a solid-state imaging device according to the second embodiment.

Here, the case in which s=2 will be described with reference to FIGS. 11A and 11B. The physical layout of the pixel array section 31 and the column circuit group 33 is shown as FIG. 11A. The concept of scanning performed by the vertical driving circuit 32 is shown as FIG. 11B.

The pixel array section 31 has 18 rows×22 columns of pixels for the sake of simplification of the drawing. In order to make the drawing easy to understand, the length of the horizontal axis in FIG. 11B is reduced by half compared with the pixel arrangement shown in FIG. 11A.

When s=2, under the control of the vertical driving circuit 32, shutter scanning proceeds by one row every 2H period. On the other hand, for example, as shown in FIG. 11B, readout scanning moves backward by three rows and then proceeds by four rows, resulting in the readout scanning proceeding by one row every 2H period.

On the basis of this vertical scanning, the period of time from the shutter scanning operation to the first readout scanning operation is defined as a storage time 1. The period of time from the first readout scanning operation to the second readout scanning operation is defined as a storage time 2. By making these two storage times (exposure times) 1 and 2 different from each other, two signals of different sensitivities, i.e., a low-sensitivity signal and a high-sensitivity signal, can be sequentially obtained from the same pixel.

Setting of the storage times 1 and 2 is performed by the control circuit 19. By synthesizing the two signals of different sensitivities in a signal processing circuit (not shown) at a subsequent stage, an image signal having a wide dynamic range can be obtained.

The above-described characteristic vertical scanning can be easily performed by employing the following configuration of the vertical driving circuit 32.

In the electronic shutter scanning system of the vertical driving circuit 32, a scanning interval is set to sH (2H in this embodiment) using a decoder or shift registers, whereby the above-described characteristic vertical scanning can be easily performed. In the readout scanning system of the vertical driving circuit 32, address setting is performed using a decoder under the control of the control circuit 36, or, for example, using S (two in this embodiment) shift registers, scanning intervals of the two shift registers are individually set to 2H, as well as, the time shift between scanning start times of both shift registers is set to the storage time 2, whereby the above-described characteristic vertical scanning can be easily performed.

As described previously, in the solid-state imaging device 30 including one column circuit group in which one column circuit disposed for one column of pixels in the pixel array section 31 performs processing upon a signal output from a pixel in a selected row, s signals of different storage times can be obtained by the following operations without waiting one scanning period even if only one column circuit is disposed for one column of pixels. The operations are that a shutter row is made to move forward by one row in an s×H period, in addition, a readout row is made to move forward or backward every 1H period as well as move both forward and backward in the s×H period so that the readout row can move forward by one row in total in the s×H period.

Accordingly, like the first embodiment, the case in which shutter time is short (shutter speed is low) can be supported. Moreover, since one column circuit is disposed for one column of pixels, and since s signals from the same pixel are processed in the same column circuit, the s signals of different sensitivities can be accurately synthesized in a signal processing circuit (not shown) at a subsequent stage, the signal processing circuit performing a synthesis operation so as to achieve a wide dynamic range.

In the solid-state imaging device 30 according to this embodiment, it is desired that the storage time 2 is set shorter than the storage time 1. In an early stage of a scanning operation, there is a period when signals of only one row are read out every 2H. By setting the storage time 2 shorter than the storage time 1, the period can be shortened.

This embodiment has been described using the case in which s=2, i.e., the storage time of one pixel 20 is changed in two stages by way of example. However, this embodiment is not limited to this case. Therefore, the case in which the storage time is changed in three or more stages can also be applied. Embodiments of the present invention can be varied by combining techniques of the first and second embodiments. For example, the case in which many signals are processed can be considered.

In the above-described embodiments, each of the column circuits in the column circuit groups 13, 14, and 33 is disposed for one column of pixels in the pixel array section 11 or 31 so that a one-to-one correspondence between column circuits and columns of pixels can be achieved. However, one column circuit may be shared by a plurality of columns.

Furthermore, the above-described embodiments have been described using the case in which each of the pixel array sections 11 and 31 is a tetragonal lattice by way of example. However, technical ideas of the first and second embodiments can be applied to the case in which pixels are not arranged in a pixel array section in a tetragonal lattice pattern. In this case, the system configuration will become more complicated.

Still furthermore, the above-described embodiments have been described using the case in which all pixels are read out by way of example, but the embodiments of the present invention can be varied by, for example, combining an all-pixel readout operation and other operations such as a thinning readout operation. The electronic shutter is not necessarily required. Operations according to embodiments of the present invention may not be necessarily always performed, but may be performed only if required after maintaining the operations operable.

Still furthermore, the above-described embodiments have been described using the case of a solid-state imaging device in which a pixel converts a light signal into an electric signal by way of example. However, devices other than the solid-state imaging device can be employed, if the devices can control sensitivity by controlling the storage time of a pixel.

EXEMPLARY APPLICATIONS

Each of the above-described solid-state imaging devices 10 and 30 according to the first and second embodiments of the present invention can be preferably used as an imaging device of an imaging apparatus such as a video camera, a digital still camera, or a camera module for a mobile device such as a mobile phone.

Figure 12:
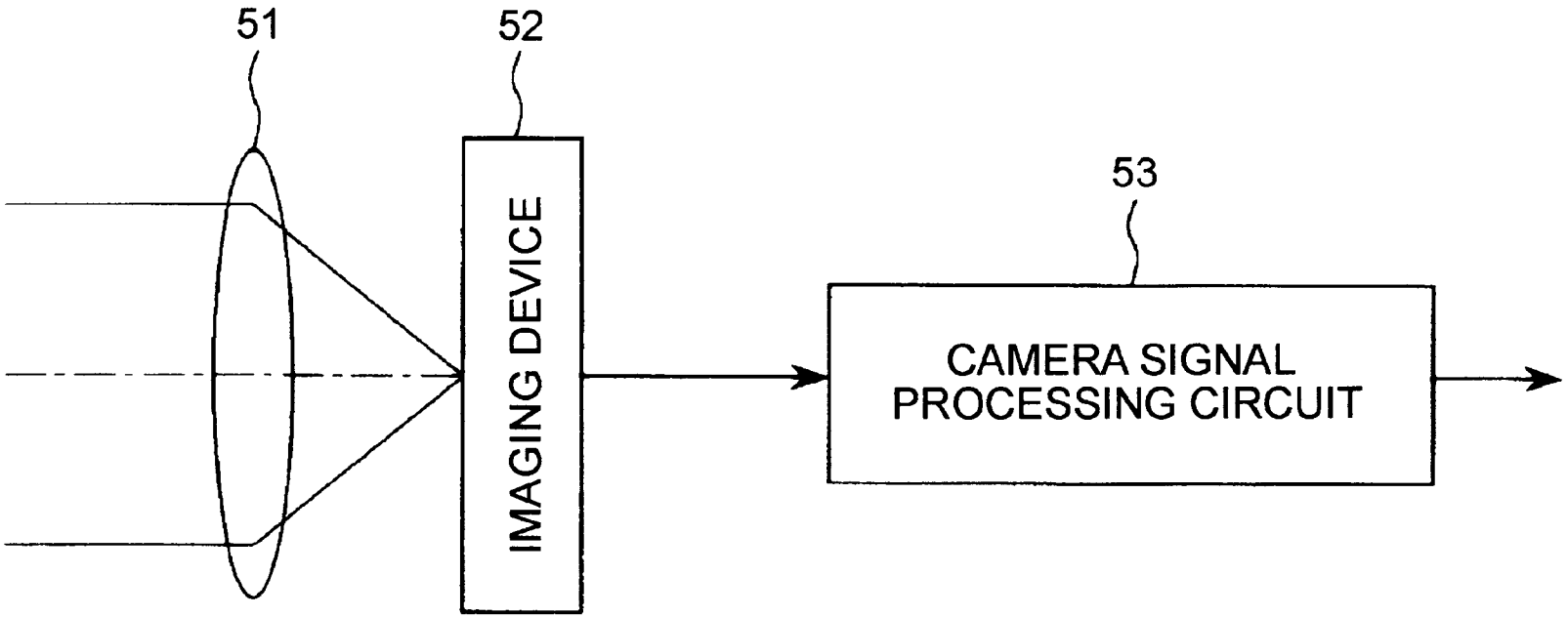
FIG. 12 is a block diagram showing an exemplary configuration of a solid-state imaging device according to embodiments of the present invention.

FIG. 12 is a block diagram showing an exemplary configuration of an imaging apparatus according to the embodiments of the present invention. As shown in FIG. 12, the imaging device is configured with an optical system including a lens 51, an imaging device 52, a camera signal processing circuit 53, etc.

The lens 51 focuses image light from a subject on an imaging surface of the imaging device 52. The imaging device 52 converts the image light having been focused on the imaging surface by the lens 51 into an electric signal in units of pixels and outputs the converted electric signals. In particular, in order to achieve a wide dynamic range, the imaging device 52 outputs as pixel signals a plurality of signals of different storage times each of which is specific to individual pixels. The above-described solid-state imaging device 10 or 30 is used as this imaging device 52.

The camera signal processing circuit 53 performs various signal processing operations upon image signals output from the imaging device 52. As one of the various processing operations, the camera signal processing circuit 53 synthesizes a plurality of signals of different storage times sequentially sent from the imaging device 52 in units of pixels so as to achieve a wide dynamic range.

As described previously, by using the above-described solid-state imaging device 10 or 30 according to the first or second embodiment of the present invention as the imaging device 52 of an imaging apparatus such as a video camera, an electronic still camera, or a camera module for a mobile device such as a mobile phone, the image quality of an image can be improved. More specifically, since each of the solid-state imaging devices 10 and 30 can process a plurality of signals of different sensitivities output from the same pixel in the same column circuit preventing a time shift of one scanning period between outputting of the plurality of signals of different sensitivities, the camera signal processing circuit 53 can acquire a high-quality image signal by accurately synthesizing the plurality of signals of different sensitivities, whereby the image quality of an image can be improved.

All functions may not be implemented in the solid-state imaging device, but may be implemented by the entire imaging apparatus. For example, the camera signal processing circuit 53 may implement the function of controlling the imaging device 52 by including the control circuit 19 or 36.

As the imaging apparatus, for example, a contact-type sensor or a radiation detection instrument that does not require the optical system including the lens 51 can be used.

It should be understood by those skilled in the art that various modifications, combinations, subcombinations and alterations may occur depending on design requirements and other factors insofar as they are within the scope of the appended claims or the equivalents thereof.

What is claimed is:

1. A solid-state imaging device comprising:

a pixel array section in which a plurality of pixels are two-dimensionally arranged, each of the pixels outputting a signal representing an external physical quantity;

a vertical driving portion for performing a plurality of sets of operations of a selection operation of a readout row and a scanning operation of the selected readout row in the pixel array section and for reading out a signal from each pixel in the selected and scanned readout rows;

a plurality of column circuit groups including a plurality of column circuits disposed for a single column of pixels in the pixel array section, the plurality of column circuits individually performing a processing operation upon a signal read out from each pixel in the readout rows; and a control portion for changing combinations of the readout rows and the column circuit groups as the scanning operation performed by the vertical driving portion proceeds so that signals read out from the same pixel can be sent to the same column circuit.

2. The solid-state imaging device according to claim 1, wherein the vertical driving portion performs the plurality of sets of operations of a selection operation of a readout row and a scanning operation of the selected readout row at an interval that enables the readout rows to connect to the corresponding column groups.

3. The solid-state imaging device according to claim 2, wherein each number of readout rows and column circuit groups is n (n is an integer of two or more), wherein the control portion controls the combinations of the readout rows and the column circuit groups by circularly changing the combinations as the scanning operation proceeds by m (m is an integer of one or more) rows in a period taken to scan m×n rows, and wherein the individual numbers of delayed rows between a leading readout row and the number of n−1 succeeding readout rows are the numbers that are divisible by n with remainders whose values are different from each other, and the numbers that are obtained by multiplying the individual values of the number of n−1 integers by m.

4. A driving method of a solid-state imaging device provided with a pixel array section in which a plurality of pixels are two-dimensionally arranged, each of the pixels outputting a signal representing an external physical quantity, the driving method of a solid-state imaging device comprising the steps of:

performing a plurality of sets of operations of a selection operation of a readout row and a scanning operation of the selected row in the pixel array section and reading out a signal from each pixel in the selected and scanned readout rows;

causing each column circuit in a plurality of column circuit groups in which a plurality of column circuits are disposed for a single column of pixels in the pixel array section to process a signal read out from each pixel in the readout rows; and changing combinations of the readout rows and the column circuit groups during the scanning operation so that signals read out from the same pixel in the pixel array section can be sent to the same column circuit.

5. The driving method of a solid-state imaging device according to claim 4, wherein each number of readout rows and column circuit groups is n (n is an integer of two or more), wherein the combinations of the readout rows and the column circuit groups are controlled by circularly changing the combinations as the scanning operation proceeds by m (m is an integer of one or more) rows in a period taken to scan m×n rows, and wherein the individual numbers of delayed rows between a leading readout row and the number of n−1 succeeding readout rows are the numbers that are divisible by n with remainders whose values are different from each other, and the numbers that are obtained by multiplying the individual values of the number of n−1 integers by m.

6. An imaging apparatus comprising:

a pixel array section in which a plurality of pixels are two-dimensionally arranged, each of the pixels outputting a signal representing an external physical quantity;

a vertical driving portion for performing a plurality of sets of operations of a selection operation of a readout row and a scanning operation of the selected readout row in the pixel array section at an interval that enables the selected and scanned readout rows to connect to the corresponding column groups, and for reading out a signal from each pixel in the selected and scanned readout rows;

a plurality of column circuit groups including a plurality of column circuits disposed for a single column of pixels in the pixel array section, the plurality of column circuits individually performing a processing operation upon a signal read out from each pixel in the readout rows; and a control portion for changing combinations of the readout rows and the column circuit groups as the scanning operation performed by the vertical driving portion proceeds so that signals read out from the same pixel can be sent to the same column circuit, wherein the vertical driving portion performs the plurality of sets of operations of a selection operation of a readout row and a scanning operation of the selected readout row at an interval that enables the selected and scanned readout rows to connect to the corresponding column groups.

7. A solid-state imaging device comprising:

a pixel array section in which a plurality of pixels are two-dimensionally arranged, each of the pixels outputting a signal representing an external physical quantity;

a vertical scanning portion for causing a readout row for reading out a signal from each pixel in the pixel array section to move backward or forward every 1H (H is defined as a unit period of scanning of the pixel array section), as well as, causing the readout row to move both backward and forward in an s×H period (s is an integer of two or more) so that the readout row can move forward by one row in total in the s×H period; and a column circuit group in which a single column circuit is disposed for a single column of pixels in the pixel array section.

8. The solid-state imaging device according to claim 7, wherein the vertical scanning portion performs a shutter scanning operation for eliminating electric charge stored in each pixel in the pixel array section before the readout scanning operation, as well as, makes the shutter scanning operation proceed by one row in the s×H period.

9. A driving method of a solid-state imaging device provided with a pixel array section in which a plurality of pixels are two-dimensionally arranged, each of the pixels outputting a signal representing an external physical quantity, the driving method of a solid-state imaging device comprising the steps of:

causing a readout row for reading out a signal from each pixel in the pixel array section to move backward or forward every 1H (H is defined as a unit period of scanning of the pixel array section), as well as, causing the readout row to move both backward and forward in an s×H period (s is an integer of two or more) so that the readout row can move forward by one row in total in the s×H period; and causing each column circuit in a column circuit group in which a single column circuit is disposed for a single column of pixels in the pixel array section to process a signal read out from each pixel in the readout row.

10. An imaging apparatus comprising:

a pixel array section in which a plurality of pixels are two-dimensionally arranged, each of the pixels including a photoelectric conversion element;

a vertical scanning portion for causing a readout row for reading out a signal from each pixel in the pixel array section to move backward or forward every 1H (H is defined as a unit period of scanning of the pixel array section), as well as, causing the readout row to move both backward and forward in an s×H period (s is an integer of two or more) so that the readout row can move forward by one row in total in the s×H period; and a column circuit group in which a single column circuit is disposed for a single column of pixels in the pixel array section.

11. The imaging apparatus according to claim 10, wherein the vertical scanning portion performs a shutter scanning operation for eliminating electric charge stored in each pixel in the pixel array section before the readout scanning operation, as well as, makes the shutter scanning operation proceed by one row in the s×H period.

12. An imaging apparatus comprising:

a pixel array section in which a plurality of pixels are two-dimensionally arranged, each of the pixels outputting a signal representing an external physical quantity;

a vertical driving portion for performing a plurality of sets of operations of a selection operation of a readout row and a scanning operation of the selected readout row in the pixel array section and for reading out a signal from each pixel in the selected and scanned readout rows;

a plurality of column circuit groups including a plurality of column circuits disposed for a single column of pixels in the pixel array section, the plurality of column circuits individually performing a processing operation upon a signal read out from each pixel in the readout rows;

a control portion for changing combinations of the readout rows and the column circuit groups as the scanning operation performed by the vertical driving portion proceeds so that signals read out from the same pixel can be sent to the same column circuit; and a signal processing circuit for performing processing upon a signal output from the column circuit group.

13. A solid-state imaging device comprising:

a pixel array section in which a plurality of pixels are two-dimensionally arranged, each of the pixels outputting an image signal; and a column circuit area including a plurality of column circuits, and wherein a vertical signal line through which image signals from a single column of pixels are output is selectively connected to a given number, which is more than one, of the column circuits, and wherein a signal from a selected pixel row is selectively output to one of the given number of the column circuits so that signals read out from the same pixel can be sent to the same column circuit.

14. The solid-state imaging device according to claim 13, wherein said column circuit area is placed at both sides of said pixel array section.

15. The solid-state imaging device according to claim 13, wherein said column circuit area is placed at one side of said pixel array section.

16. An imaging apparatus comprising:

a pixel array section in which a plurality of pixels are two-dimensionally arranged, each of the pixels outputting an image signal;

a column circuit area including a plurality of column circuits; and a signal processing portion for performing processing upon a signal output from said column circuit area, wherein a vertical signal line through which image signals from a single column of pixels are output is selectively connected to a given number, which is more than one, of the column circuits, and wherein a signal from a selected pixel row is selectively output to one of the given number of the column circuits so that signals read out from the same pixel can be sent to the same column circuit.

*17. A method of driving a solid-state imaging device provided with a pixel array section in which a plurality of pixels are two-dimensionally arranged, each of the pixels outputting an image signal, the method comprising the steps of:*

*providing a column circuit area including a plurality of column circuits;*

*selectively connecting images signals output by a single column of pixels through a vertical signal line to a given number, greater than one, of the column circuits; and*

*selectively outputting a signal of a selected pixel row to one of the given number of the column circuits so that signals read out from the same pixel can be sent to the same column circuit.*

*18. The method of claim 17, wherein the column circuit area is provided at both sides of said pixel array section.*

*19. The method of claim 17 wherein the column circuit area is provided at one side of said pixel array section.*

* * * * *